(12) United States Patent
Paul et al.

(10) Patent No.: US 11,568,241 B2
(45) Date of Patent: Jan. 31, 2023

(54) DEVICE, SYSTEM AND METHOD FOR VARYING A SYNAPTIC WEIGHT WITH A PHASE DIFFERENTIAL OF A SPIKING NEURAL NETWORK

(71) Applicant: INTEL CORPORATION, Santa Clara, CA (US)

(72) Inventors: Arnab Paul, Hillsboro, OR (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 330 days.

(21) Appl. No.: 16/648,437

(22) PCT Filed: Dec. 19, 2017

(86) PCT No.: PCT/US2017/067401
§ 371 (c)(1),
(2) Date: Mar. 18, 2020

(87) PCT Pub. No.: WO2019/125419
PCT Pub. Date: Jun. 27, 2019

(65) Prior Publication Data
US 2020/0218977 A1    Jul. 9, 2020

(51) Int. Cl.
*G06N 3/08* (2006.01)
*G06N 3/04* (2006.01)

(52) U.S. Cl.
CPC ............. *G06N 3/08* (2013.01); *G06N 3/049* (2013.01)

(58) Field of Classification Search
CPC ........... G06N 3/08; G06N 3/049; G06N 3/088
See application file for complete search history.

(56) References Cited

U.S. PATENT DOCUMENTS

2014/0025613 A1  1/2014  Ponulak
2014/0032458 A1  1/2014  Sinyavskiy et al.
(Continued)

FOREIGN PATENT DOCUMENTS

JP    2017516192    6/2017

OTHER PUBLICATIONS

Extended European Search Report for European Patent Application No. 17935062.4, dated Jul. 1, 2021.
(Continued)

*Primary Examiner* — Sung S Ahn
(74) *Attorney, Agent, or Firm* — Essential Patents Group, LLP.

(57) ABSTRACT

Techniques and mechanisms for determining the value of a weight associated with a synapse of a spiking neural network. In an embodiment, a first spike train and a second spike train are output, respectively, by a first node and a second node of the spiking neural network, wherein the synapse is coupled between said nodes. The weight is applied to signaling communicated via the synapse. A value of the weight is updated based on a product of a first value and a second value, wherein the first value is based on a first rate of spiking by the first spike train, and the second value is based on a second rate of spiking by the second spike train. In another embodiment, the weight is updated based on a product of a derivative of the first rate of spiking and a derivative of the second rate of spiking.

25 Claims, 8 Drawing Sheets

(56) References Cited

U.S. PATENT DOCUMENTS

| | | | |
|---|---|---|---|
| 2014/0032460 A1* | 1/2014 | Cruz-Albrecht | G06N 3/049 706/16 |
| 2014/0351186 A1 | 11/2014 | Julian et al. | |
| 2015/0074026 A1 | 3/2015 | Szatmary et al. | |
| 2015/0269481 A1 | 9/2015 | Annapureddy et al. | |
| 2018/0276529 A1* | 9/2018 | Paul | G06N 3/0454 |

OTHER PUBLICATIONS

Office Action for Japanese Patent Application No. 2020-527791, dated Dec. 14, 2021.

Qiao., et al., "A Quaternionic Rate-Based Synaptic Learning Rule Derived from Spike-Timing Dependent Plasticity", International Conference on Image Analysis and Processing, (ICIAP), Naples Italy Sep. 9-13, 2013, Retrieved May 31, 2017, 457 pages.

Sugomori, Y., "Answer Book", Deep Learning, First Edition, May 25, 2017, p. 162, ISBN:978-4-8399-6251-7. No translation available.

International Search Report and Written Opinion from PCT/US2017/067401 dated Sep. 21, 2018, 15 pgs.

Bengio, Y. et al., "STDP as presynaptic activity times rate of change postsynaptic activity", <https://arxiv.org/pdf/1509.05936.pdf>, Mar. 2016.

Burbank, K.S., "Mirrored STDP Implements Autoencoder Learning in a Network of Spiking Neurons", PLOS Computational Biology, 2015.

Fries, P., "Rhythms for Cognition: Communication through Coherence", Neuron, 88.1, 220-235, 2015.

Park, S. et al., "Neuronal Allocation to a Hippocampal Engram", Neuropsychopharmacology, Dec.; 41 (13): 2987-2993; 2016.

Siegel, M.W., "Phase-dependent neuronal coding of objects in short-term memory", Proceedings of the National Academy of Sciences, 106: 21341-21346; 2009.

Srinivasa, N. et al., "Unsupervised discrimination of patters in spiking neural networks with excitatory and inhibitory synaptic plasticity", Front. Comput. Neurosci. (2014).

Yang, R., "Synaptic Suppression Triplet-STDP Learning Rule Realized in Second-Order Memristors", Advanced Functional Materials; vol. 28, 2018.

International Preliminary Report on Patentability from PCT/US2017/067401 dated Jul. 2, 2020, 10 pgs.

Office Action for Japanese Patent Application No. 2020-527791, dated May 9, 2022.

* cited by examiner

DEVICE, SYSTEM AND METHOD FOR VARYING A SYNAPTIC WEIGHT WITH A PHASE DIFFERENTIAL OF A SPIKING NEURAL NETWORK

CLAIM OF PRIORITY

This Application is a National Stage Entry of, and claims priority to, PCT Patent Application No. PCT/US17/67401, filed on 19 Dec. 2017 and titled "DEVICE, SYSTEM AND METHOD FOR VARYING A SYNAPTIC WEIGHT WITH A PHASE DIFFERENTIAL OF A SPIKING NEURAL NETWORK", which is incorporated by reference in its entirety for all purposes.

BACKGROUND

Embodiments described herein generally relate to spiking neural networks, and more particularly, but not exclusively, relate to techniques for determining a synaptic weight value.

A variety of approaches are currently used to implement neural networks in computing systems. The implementation of such neural networks, commonly referred to as "artificial neural networks", generally include a large number of highly interconnected processing elements that exhibit some behaviors similar to that of organic brains. Such processing elements may be implemented with specialized hardware, modeled in software, or a combination of both.

Spiking neural networks (or "SNNs") are increasingly being adapted to provide next-generation solutions for various applications. SNNs variously rely on signaling techniques wherein information is communicated using a time-based relationship between signal spikes. As compared to typical deep-learning architectures—such as those provided with a convolutional neural network (CNN) or a recurrent neural network (RNN)—a SNN provides an economy of communication which, in turn, allows for orders of magnitude improvement in power efficiency.

Neural networks are configured to implement features of "learning", which generally is used to adjust the weights of respective connections between the processing elements that provide particular pathways within the neural network and processing outcomes. Existing approaches for implementing learning in neural networks have involved various aspects of unsupervised learning (e.g., techniques to infer a potential solution from unclassified training data, such as through clustering or anomaly detection), supervised learning (e.g., techniques to infer a potential solution from classified training data), and reinforcement learning (e.g., techniques to identify a potential solution based on maximizing a reward). However, each of these learning techniques are complex to implement, and extensive supervision or validation is often required to ensure the accuracy of the changes that are caused in the neural network.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
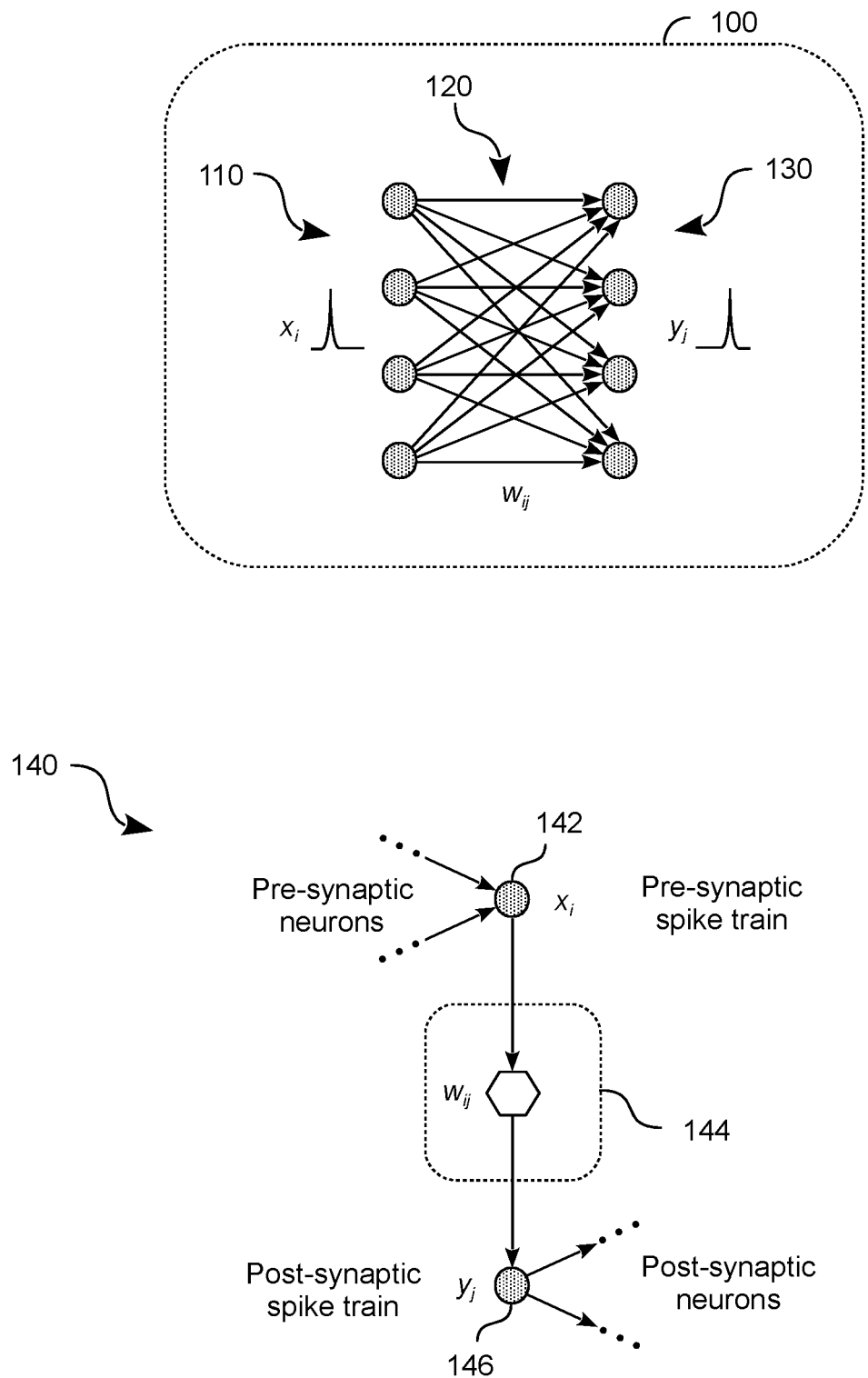
FIG. 1 shows diagrams each illustrating features of a simplified neural network according to an embodiment.

Embodiments described herein variously provide techniques and mechanisms to update or otherwise determine the respective values of one or more synaptic weights of a spiking neural network. Such determining—e.g., based on a relationship between the respective spiking rates of spike trains—may facilitate operation of a spiking neural network as an auto-encoder. A spiking neural network may function as an "auto-encoder" where training, based on different reference patterns, includes some or all nodes (or "neurons") of the spiking neural network each encoding their corresponding receptive field with a respective portion of a presented pattern. Auto-encoders provide critical functions in many applications where, due to a labeled data-set being limited or absent, unsupervised learning is the only option available. Even in some cases of supervised learning, auto-encoders may be useful for pre-training processes to initialize synaptic weights.

Traditionally, the training process for various types of auto-encoders is time consuming or otherwise inefficient. For example, some conventional types of neural network learning variously apply Synaptic Time Dependent Plasticity (STDP) rules. One disadvantage of STDP-based learning is that it tends to converge extremely slowly due, for example, to many processing cycles which involve network learning and unlearning. Although such cycles tend to be quite wasteful, there are unavoidable in many standard STDP schemes. By performing synaptic weight value calculations which are based at least in part on the respective spiking rates of different spike trains—e.g., based on a ratio of such spiking rates—some embodiments variously enable a modified STDP-based learning, which is referred to herein as Wave-based STDP (WSTDP).

Certain features of various embodiments are described herein with reference to a training of a spiking neural network to recognize an image type. Such image recognition functionality may implement a corresponding object recognition functionality, wherein training to recognize an image type of a reference image includes training to recognize an object type of an object which is represented in that reference image. However, in some embodiments, a spiking neural network may be trained to additionally or alternatively recognize any of a variety of other data types (e.g., including different image types and/or one or more data types other than any image type). For example, a spiking neural network may be trained, based on a reference video sequence, to recognize a particular video sequence type (and/or a corresponding action type of an action which is represented in the reference video sequence). In other embodiments, training based on reference audio may be adapted to facilitate recognition of a particular audio type with a spiking neural network.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any of a variety of electronic devices including hardware and/or executing software to provide a spiking neural network.

FIG. 1 illustrates an example diagram of a spiking neural network 100, providing an illustration of connections 120 between a first set of nodes 110 (e.g., neurons) and a second set of nodes 130 (e.g., neurons). Some or all of a neural network (such as the spiking neural network 100) may be organized into multiple layers—e.g., including input layers and output layers. It will be understood that the spiking neural network 100 only depicts two layers and a small number of nodes, but other forms of neural networks may include a large number of variously configured nodes, layers, connections, pathways and/or the like.

Data that is provided into the neutral network 100 may be first processed by synapses of input nodes. Interactions between the inputs, the node's synapses and the node itself govern whether an output is provided via an axon to another node's synapse. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular node "fires" to provide data to a further connected node is dependent on the activation function applied by the node and the weight of the synaptic connection (e.g., $w_{ij}$) from node i (e.g., located in a layer of the first set of nodes 110) to node j (e.g., located in a layer of the second set of nodes 130). The input received by node i is depicted as value $x_i$, and the output produced from node j is depicted as value $y_j$. Thus, the processing conducted in a neural network is based on weighted connections, thresholds, and evaluations performed among the neurons, synapses, and other elements of the neural network.

In an example, the neural network 100 is established from a network of spiking neural network cores, with the neural network cores communicating via short packetized spike messages sent from core to core. For example, each neural network core may implement some number of primitive nonlinear temporal computing elements as nodes, so that when a node's activation exceeds some threshold level, it generates a spike message that is propagated to a fixed set of fanout nodes contained in destination cores. The network may distribute the spike messages to all destination nodes, and in response those nodes update their activations in a transient, time-dependent manner.

The neural network 100 further shows the receipt of a spike, represented in the value $x_i$, at node i in a first set of nodes (e.g., a node of the first set of nodes 110). The output of the neural network 100 is also shown as a spike, represented by the value $y_j$, which arrives at node j in a second set of nodes (e.g., a node of the first set of nodes 110) via a path established by the connections 120. In a spiking neural network all communication occurs over event-driven action potentials, or spikes. In an example, spikes convey no information other than the spike time as well as a source and destination node pair. Computations may variously occur in each a respective node as a result of the dynamic, nonlinear integration of weighted spike input using real-valued state variables. The temporal sequence of spikes generated by or for a particular node may be referred to as its "spike train."

In an example of a spiking neural network, activation functions occur via spike trains, which means that time is a factor that has to be considered. Further, in a spiking neural network, each node may provide functionality similar to that of a biological node, as the artificial node receives its inputs via synaptic connections to one or more "dendrites" (part of the physical structure of a biological node), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network node operate to increase or decrease its internal membrane potential, making the node more or less likely to fire. Further, in a spiking neural network, input connections may be stimulatory or inhibitory. A node's membrane potential may also be affected by changes in the node's own internal state ("leakage").

FIG. 1 also illustrates an example inference path 140 in a spiking neural network, such as may be implemented by a form of the neural network 100 or other forms of neural networks. The inference path 140 of the node includes a pre-synaptic node 142, which is configured to produce a pre-synaptic spike train $x_i$ representing a spike input. A spike train is a temporal sequence of discrete spike events, which provides a set of times specifying at which time a node fires.

As shown, the spike train $x_i$ is produced by the node before the synapse (e.g., node 142), and the spike train $x_i$ is evaluated for processing according to the characteristics of a synapse 144. For example, the synapse may apply one or more weights, e.g., weight $w_{ij}$, which are used in evaluating the data from the spike train $x_i$. Input spikes from the spike train $x_i$ enter a synapse such as synapse 144 which has a weight $w_{ij}$. This weight scales what the impact of the presynaptic spike has on the post-synaptic node (e.g., node 146). If the integral contribution of all input connections to a post-synaptic node exceeds a threshold, then the post-synaptic node 146 will fire and produce a spike. As shown, $y_j$ is the post-synaptic spike train produced by the node following the synapse (e.g., node 146) in response to some number of input connections. As shown, the post-synaptic spike train $y_j$ is distributed from the node 146 to one or more other post-synaptic nodes.

Some embodiments variously include or otherwise facilitate processing whereby a value of a synaptic weight—e.g., a value of weight $w_{ij}$—may vary with a correlation (if any) between respective phase changes by a signal generated with one node and by another signal generated with a different node. The weight may apply to a synapse which is coupled between these two nodes and, in some embodiments, may be based in part on a spike train which communicated via that synapse. For example, a change to the value of a synaptic weight may depend on the respective timings of a pre-synaptic spike train and a post-synaptic spike train (where "pre" and "post," in this context, refer to the same one synapse). Where a post-synaptic spike follows after a pre-synaptic spike, a close temporal proximity of this pre-then-post signal spiking pair may be indicative of a causal relationship which, in some embodiments, is to contribute to an increased value of the synaptic weight. By contrast, where a post-synaptic spike precedes a pre-synaptic spike, a close temporal proximity of this post-then-pre signal spiking pair may indicate a non-causal (or anti-causal) relationship and, accordingly, may contribute to the synaptic weight value being decreased.

Some embodiments variously provide for an increased synaptic weight based on a pre-synaptic node and a post-synaptic node concurrently increasing (or concurrently decreasing) their respective spiking rates. In some embodiments, the synaptic weight may be further based on an amount to which such a pre-synaptic node and post-synaptic node are spiking in-phase with each other. Some embodiments variously provide efficient techniques and/or mechanisms for updating or otherwise determining the value of a synaptic weight—e.g., wherein a change to apply to the synaptic weight is determined based on based on changing rates of spiking by nodes of a spiking neural network.

For example, referring again to FIG. 1, node 142 may output a spike train $I_i$ via synapse 144 or, in some embodiments, via another node of spiking neural network 100. Concurrent with spike train $I_i$, node 146 may output another spike train $I_j$ to one or more other nodes of spiking neural network 100. In such an embodiment, spike train $I_i$ may exhibit a rate of spiking (or "spiking rate") $r_i$—e.g., indicated in Hertz (Hz) or any of various other units representing a number of signal spikes per unit of time. Spiking rate $r_i$ may represent a count of signal spikes of a membrane potential at node 142, the count within a fixed-size time window which moves along in time. Similarly, spike train $I_j$ may exhibit a spiking rate $r_j$—e.g., wherein spiking rate $r_j$ represents another count (also within some fixed-size time window which moves along in time) of signal spikes of a membrane potential at node 146. At a given time during operation of spiking neural network 100, rates $r_i$, $r_j$ may be variously unchanging, increasing or decreasing.

Some embodiments enable the weight $w_{ij}$ assigned to synapse 144 to vary with a phase difference $\Delta\phi_{ij}$ between spike trains $I_i$, $I_j$—e.g., wherein $\phi_i$ is a phase of spike train $I_i$, $\phi_j$ is a phase of spike train $I_j$, and phase difference $\Delta\phi_{ij}$ is equal to the difference $(\phi_j-\phi_i)$. In some embodiments, a changing value of weight $w_{ij}$ may coincide with or otherwise correspond to a changing phase difference $\Delta\phi_{ij}$ (where $0 \leq \phi_i$, $\phi_j \leq 2\pi$).

Varying weight $w_{ij}$ may include determining, as a function of spike rates $r_i$, $r_j$, a change $\Delta w_{ij}$ which is to be applied to $w_{ij}$. Such a function of spike rates $r_i$, $r_j$ may serve as an analog to variance of $w_{ij}$ with phase difference $\Delta\phi_{ij}$. For example, $\Delta w_{ij}$ may be calculated based at least in part on a product of a first value and a second value, wherein the first value and second values are based, respectively, on a derivative $dr_i/dt$ of rate $r_i$ and a derivative $dr_j/dt$ of rate $r_j$.

By way of illustration and not limitation, a value of $\Delta w_{ij}$ may be given by the following equation:

$$\Delta w_{ij} = A_0 \frac{dr_i}{dt} \cdot \frac{dr_j}{dt} \qquad (1)$$

where $A_0$ is a scaling parameter. In an embodiment where $A_0$ is a positive number, the value of $w_{ij}$ may be increased in response to rates $r_i$, $r_j$ are both increasing at the same time or both decreasing at the same time. The increase to $w_{ij}$ is to take into account that spike trains $I_i$, $I_j$ are remaining in-phase with each other, that any phase difference $\Delta\phi_{ij}$ is remaining constant, or that one of $dr_i/dt$ and $dr_j/dt$ is mitigating a change to $\Delta\phi_{ij}$ that otherwise would result from the other of $dr_i/dt$ and $dr_j/dt$. Alternatively or in addition, the value of $w_{ij}$ may be decreased in response to one or both of rates $r_i$, $r_j$ increasing while the other of rates $r_i$, $r_j$ is decreasing. In some embodiments, $\Delta w_{ij}$ is set to zero ("0") at a time when at least one of $dr_i/dt$ and $dr_j/dt$ is unchanging.

Updating weight $w_{ij}$ may be based on a sample $\Delta w_{ij}(t)$ of $\Delta w_{ij}$ which is taken during a time period t. The time period t may be one of a sequence of time periods which, for example, are each of the same duration. The sequence may include a next time period (t+1) which immediately succeeds time period t. The sample $\Delta w_{ij}(t)$ may, in turn, be based on respective samples of $dr_i/dt$ and $dr_j/dt$ which are each taken during time period t—e.g., wherein $\Delta w_{ij}(t)$ is determined according to the following:

$$\Delta w_{ij}(t) = A_0 \left(\frac{dr_i}{dt}\bigg|_t\right) \cdot \left(\frac{dr_j}{dt}\bigg|_t\right) \qquad (2)$$

In one such embodiment, a weight value $w_{ij}(t)$ corresponding to time period t may be updated to a weight value $w_{ij}(t+1)$ for a next time period (t+1)—e.g., by adding a change value $\Delta w_{ij}(t)$ which has been sampled during, or otherwise calculated for, time period t. Such an update to the weight value may be according to the following:

$$w_{ij}(t+1) = w_{ij}(t) + \Delta w_{ij}(t) \qquad (3)$$

However, embodiments may provide any of a variety of other weight update calculations which are generally of the following form:

$$w_{ij}(t+1) = f\left\{w_{ij}(t), \frac{dr_i}{dt}\bigg|_t, \frac{dr_j}{dt}\bigg|_t\right\} \qquad (4)$$

Although some embodiments are not limited in this regard, nodes of spiking neural network 100 may be a modified version of a Leaky Integrate-and-Fire (LIF) type—e.g., wherein, based on one or more spiking signals received at a given node j, the value of a membrane potential $v_m$ of that node j may spike and then decay over time. The spike and decay behavior of such a membrane potential $v_m$ may, for example, be according to the following:

$$\tau_m\left(\frac{dv_m}{dt}\right) \propto -(v_m - v_{rest}) + w_{ij} \cdot I_{ij} + J_b, \qquad (5)$$

where $v_{rest}$ is a resting potential toward which membrane potential $v_m$ is to settle, $\tau_m$ is a time constant for an exponential decay of membrane potential $v_m$, $w_{ij}$ is a synaptic weight of a synapse from another node i to node j, $I_{ij}$ is a spiking signal (or "spike train") communicated to node j via said synapse, and $J_b$ is a value that, for example, is based on a bias current or other signal provided to node j from some external node/source. The spiking neural network may operate based on a pre-defined threshold voltage $V_{threshold}$, wherein the node j is configured to output a signal spike in response to its membrane potential $v_m$ being greater than $V_{threshold}$. Additionally or alternatively, updating the value of weight $w_{ij}$ calculation of weight $w_{ij}$ may be further based on a decay component—e.g., wherein $w_{ij}(t+1)$ for time period (t+1) is determined according to the following:

$$w_{ij}(t+1) = w_{ij}(t) \cdot e^{-(t/\tau_g)} + \Delta w_{ij}(t) \qquad (6)$$

where $\tau_g$ is the time-constant for decay of weight $w_{ij}$.

Figure 2:
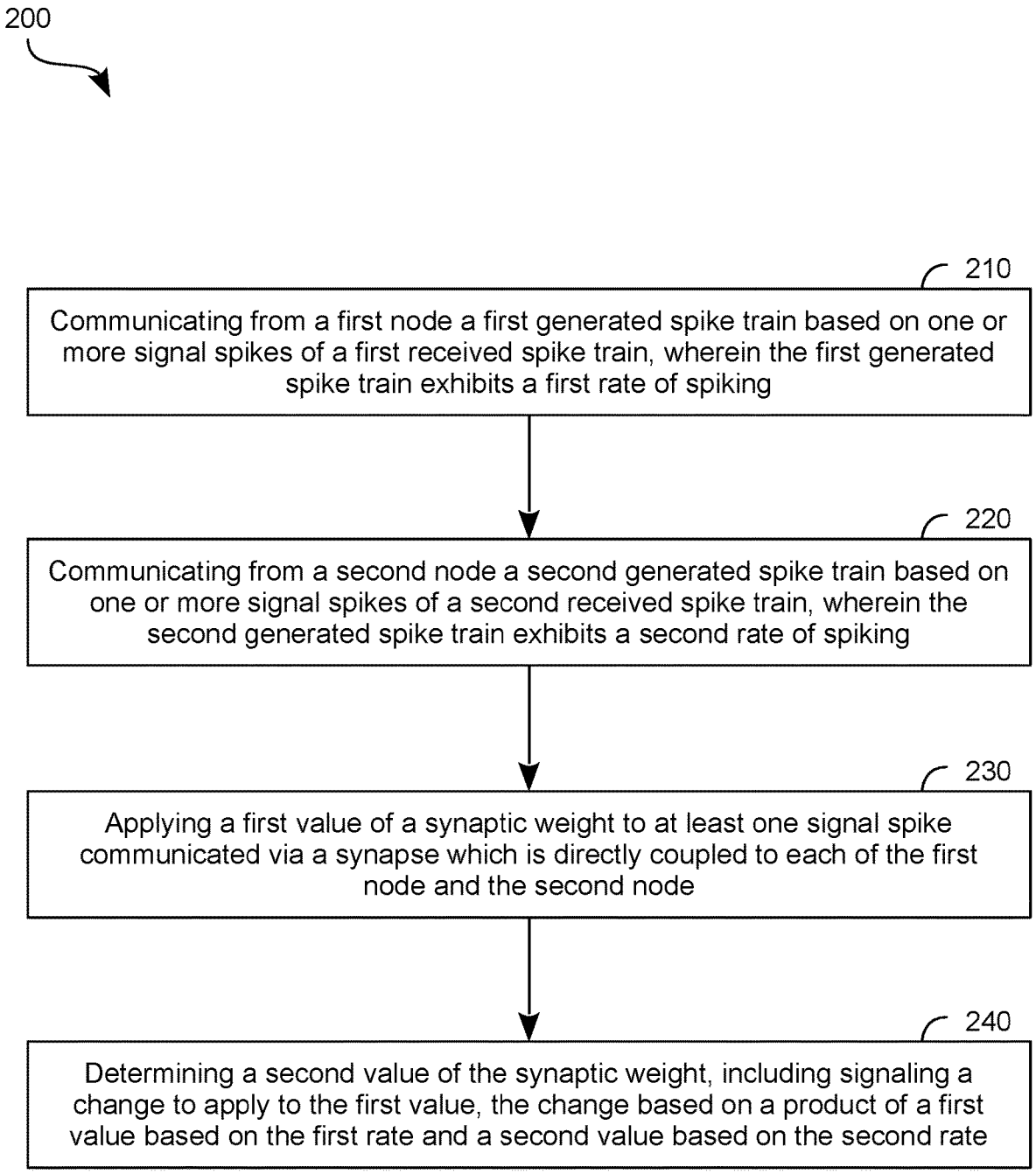
FIG. 2 is a flow diagram illustrating elements of a method at a spiking neural network to determine a value of a synaptic weight according to an embodiment.

FIG. 2 shows features of a method 200 to determine a value of a synaptic weight with a spiking neural network according to an embodiment. Method 200 may be performed—with neural network 100, for example—to train a spiking neural network to recognize a data type such as an image type which is represented in a reference image. Method 200 is one example of a process whereby a synaptic weight value is to vary with a phase difference between spike trains which are provided each with a different respective one of two nodes. The synaptic weight value may be applied to a synapse which is coupled between the two nodes.

As shown in FIG. 2, method 200 may include (at 210) communicating a first generated spike train from a first node of a spiking neural network. The first generated spike train may be based on one or more signal spikes of a first received spike train that is provided to the first node, wherein the first generated spike train exhibits a first rate of spiking. In one example embodiment, the first received spike train is based on another spike train (referred to as an "input spike train") which is communicated to the spiking neural network—e.g., by external encoder circuitry or other such logic. The input spike train may represent (alone or in combination with one or more other input spike trains) an encoded version of at least some pixels of an image. By way of illustration and not limitation, the input spike train may comprise a cyclical component which, for at least some period of time, has a constant rate of signal spiking and a time-varying amplitude. In such an embodiment, an intensity value of one pixel may be represented by a maximum amplitude of the cyclical component.

Method 200 may further comprise (at 220) communicating a second generated spike train from a second node of the spiking neural network, wherein the second generated spike train is based on one or more signal spikes of a second received spike train that is provided to the second node. The second generated spike train may exhibit a second rate of spiking, where a synapse is directly coupled to each of the first node and the second node. For example, the second generated spike train may be determined at the second node based on the first generated spike train—e.g., wherein the first node sends the first generated spike train to the second node via the synapse. Alternatively, the first generated spike train and the second generated spike train may each be communicated via a respective path which is independent of the synapse. In some embodiments, the first generated spike train and the second generated spike train are each determined based on a different respective spike train.

In some embodiments, method 200 further comprises (at 230) applying a first value of a synaptic weight to at least one signal spike communicated via the synapse which is directly coupled to each of the first node and the second node. The applying at 230 may be performed at one of the first node and the second node—e.g., at the second node in response to a receipt of the first generated spike train at the second node.

Method 200 may further comprise (at 240) determining a second value of the synaptic weight, including signaling a change to apply to the first value of the synaptic weight. The change may be determined at 240 based on a product of a first value and a second value, wherein the first value and the second value are based on the first rate of spiking and the second rate of spiking, respectively. The determining at 240 may be performed by the same one of the first node and the second node which performs the applying at 230, in some embodiments. Training of the spiking neural network to recognize a data type may be based on the change being applied to the first value of the synaptic weight.

In an embodiment, the change determined at 240 is based on a product of a first derivative of the first rate of spiking and a second derivative of the second rate of spiking. The first derivative and the second derivative may each include a respective one of a first order derivative (with respect to time, for example) and a second order derivative. For example, where one of the first rate of spiking and the second rate of spiking is a rate r, a corresponding one of the first derivative and the second derivative may be a first order derivative $dr/dt$ of rate r with respect to time t, or a second order derivative $d^2r/dt^2$ of rate r with respect to time t.

In some embodiments, method 200 additionally or alternatively includes one or more other operations (not shown) which provide various configurations of the spiking neural network each during a different respective time period. Multiple ones of such configurations may each enable a different respective subset of nodes of the spiking neural network to perform a respective synaptic weight determining process—e.g., wherein other nodes are each prevented from similarly performing a respective synaptic weight determining process. For a given one of such configurations, each node of a respective subset of nodes may be enabled to perform a synaptic weight update according to operations 230, 240.

For example, additional or alternative operations (not shown) of method 200 may comprise selecting a first subset of nodes of the spiking neural network to train the spike neural network, during a first time period, to determine updates to weights of respective synapses. In such an embodiment, the one or more other operations may further comprise selecting a second subset of nodes of the spiking neural network (different from the first subset) to train the spike neural network, during a second time period, to determine other updates to weights of respective synapses. By successively implementing different configurations of the spiking neural network over time, some embodiments variously limit the possibility of spiking neural network training which has to be subsequently unlearned.

Figure 3A:
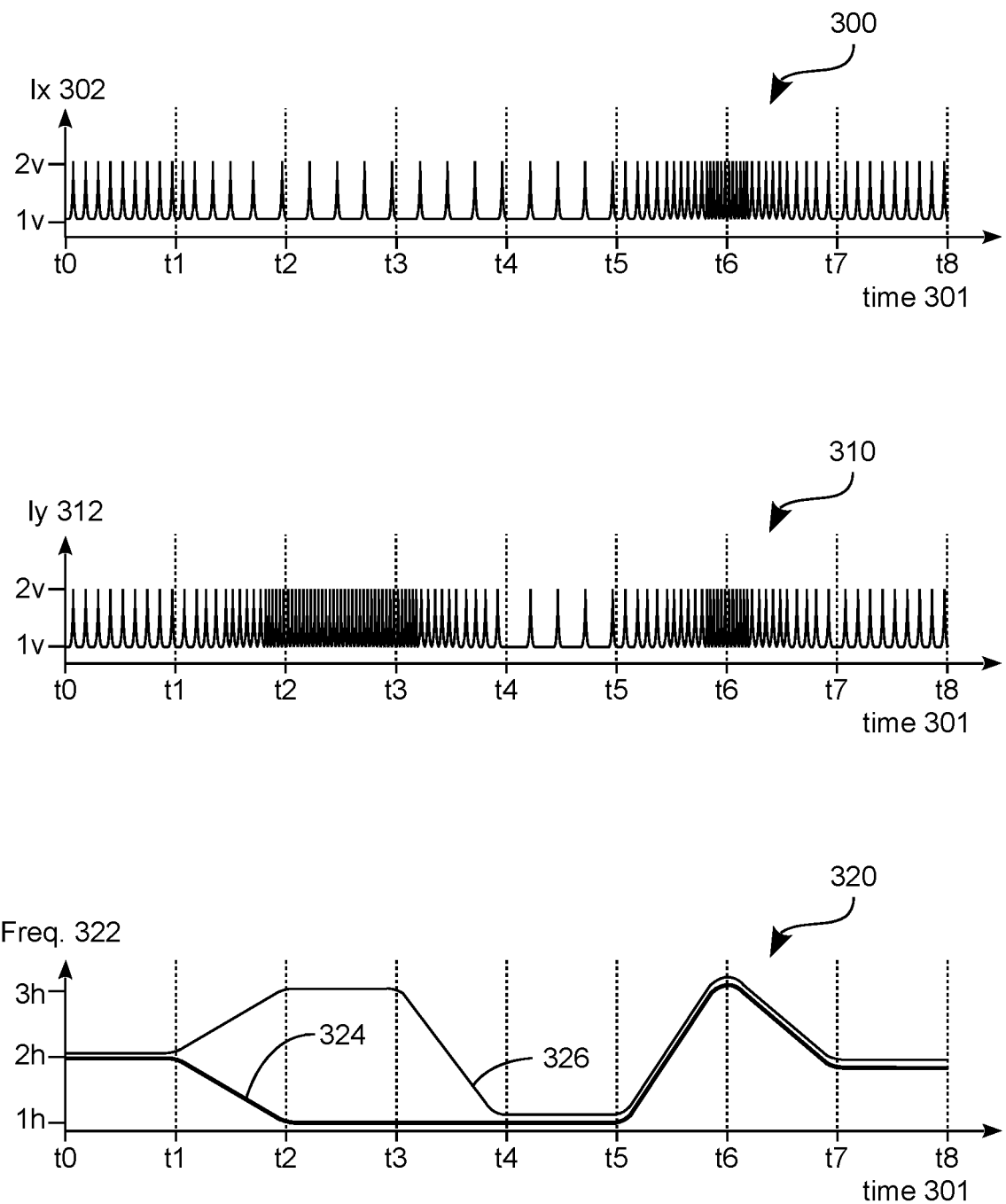
FIGS. 3A and 3B show timing diagrams variously illustrating respective values of signals and parameters to determine a value of a synaptic weight according to an embodiment.
Figure 3B:
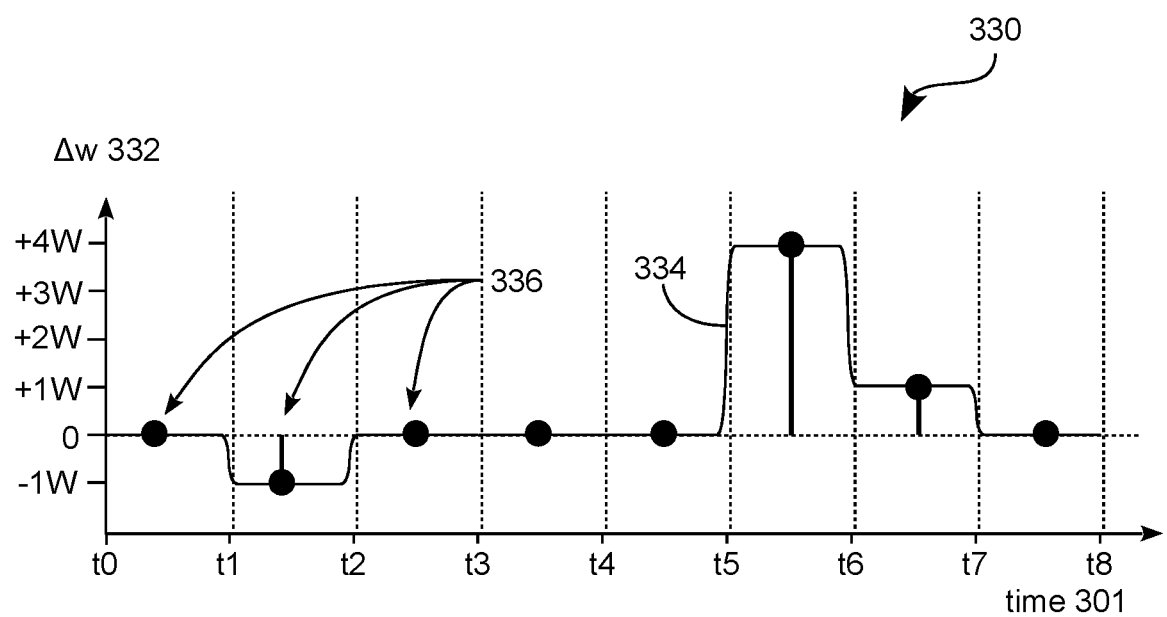

FIGS. 3A and 3B shows timing diagrams 300, 310, 320, 330 which illustrate, each with respect to a time axis 301, a respective signal communicated with a spiking neural network according to an embodiment. Signaling such as that shown in timing diagrams 300, 310, 320, 330 may be provided with neural network 100—e.g., wherein operations of method 200 include or otherwise result in such signaling.

Timing diagram 300 shows a spike train Ix 302 generated by a first node of a spiking neural network. Timing diagram 310 shows a spike train Iy 312 generated by a second node of the spiking neural network, wherein a synapse is coupled between (and directly to each of) the first node and the second node. Although values of spike trains Ix 302, Iy 312 are each shown relative to multiples of a voltage v (where v is equal to 100 mV, for example), some embodiments are not limited to a particular amplitude of spiking by one or either of spike trains Ix 302, Iy 312. Timing diagram 320 shows, in a frequency axis 322, a plot 324 of a first rate of spiking by spike train Ix 302 and another plot 326 of a second rate of spiking by spike train Iy 312. Although values of spike trains Ix 302, Iy 312 are each shown relative to multiples of a frequency h (where h is equal to 4 MHz, for example), some embodiments are not limited to a particular range of spiking frequencies by one or either of spike trains Ix 302, Iy 312. Timing diagram 300 shows a time-dependent value of a change Δw 332 that may be applied to a weight w of the synapse which is coupled to each of the nodes which generate the respective spike trains Ix 302, Iy 312. Such a synapse may communicate one of spike trains Ix 302, Iy 312, although some embodiments are not limited in this regard.

The respective spiking rates of spike trains Ix 302, Iy 312 may be variously decreasing, increasing or unchanging at different times—e.g., during a period from the time t0 to the time t8 shown. In the example scenario variously illustrated by timing diagrams 300, 310, 320, 330, the respective spiking rates of spike trains Ix 302, Iy 312 are each somewhat stable (i.e., having little slope, if any) during the time period [t0-t1], and also during the time period [t7-t8]. The spiking rate of spike train Iy 312 is also stable during the time period [t2-t3], where the spiking rate of spike train Ix 302 is stable during the time periods [t2-t3] and [t3-t4]. The respective spiking rates of spike trains Ix 302, Iy 312 are also concurrently increasing during the time period [t5-t6], concurrently decreasing during the time period [t6-t7], and changing with slopes of opposite signs during the time period [t1-t2].

As shown by the plot 334 in timing diagram 330, the value of Δw 332 may vary over time in relation to a product of the respective slopes of plots 324, 326. Although values of change Δw 332 are shown relative to multiples of some scalar value W, the meaning of such a scalar value may be entirely dependent upon implementation specific details including, for example, the synaptic weight scale used, the particular nodes generating spike trains Ix 302, Iy 312, the information represented by spike trains Ix 302, Iy 312, and the sensitivity to change which the particular synapse is to have.

In the illustrative scenario shown, plot 334 is equal to or nearly zero ("0") during time periods when at least one of plots 324, 326 has zero slope—i.e., during time periods when at least one of spike trains Ix 302, Iy 312 has a stable spiking rate. During time periods when plots 324, 326 are both increasing or both decreasing, plot 334 may have a positive value which is in proportion to a product of the rates of such concurrent increasing (or concurrent decreasing). During time periods when plots 324, 326 are changing with slopes of opposite signs, plot 334 may have a negative value which is in proportion to a product of the rates of such concurrent increasing (or concurrent decreasing). Timing diagram 330 also illustrates one example of times when respective samples 336 of plot 334 are taken—e.g., where each sample 336, at a corresponding time t, is to determine a respective change Δw(t) in a sequence of changes to be successively applied to the synaptic weight.

Figure 4:
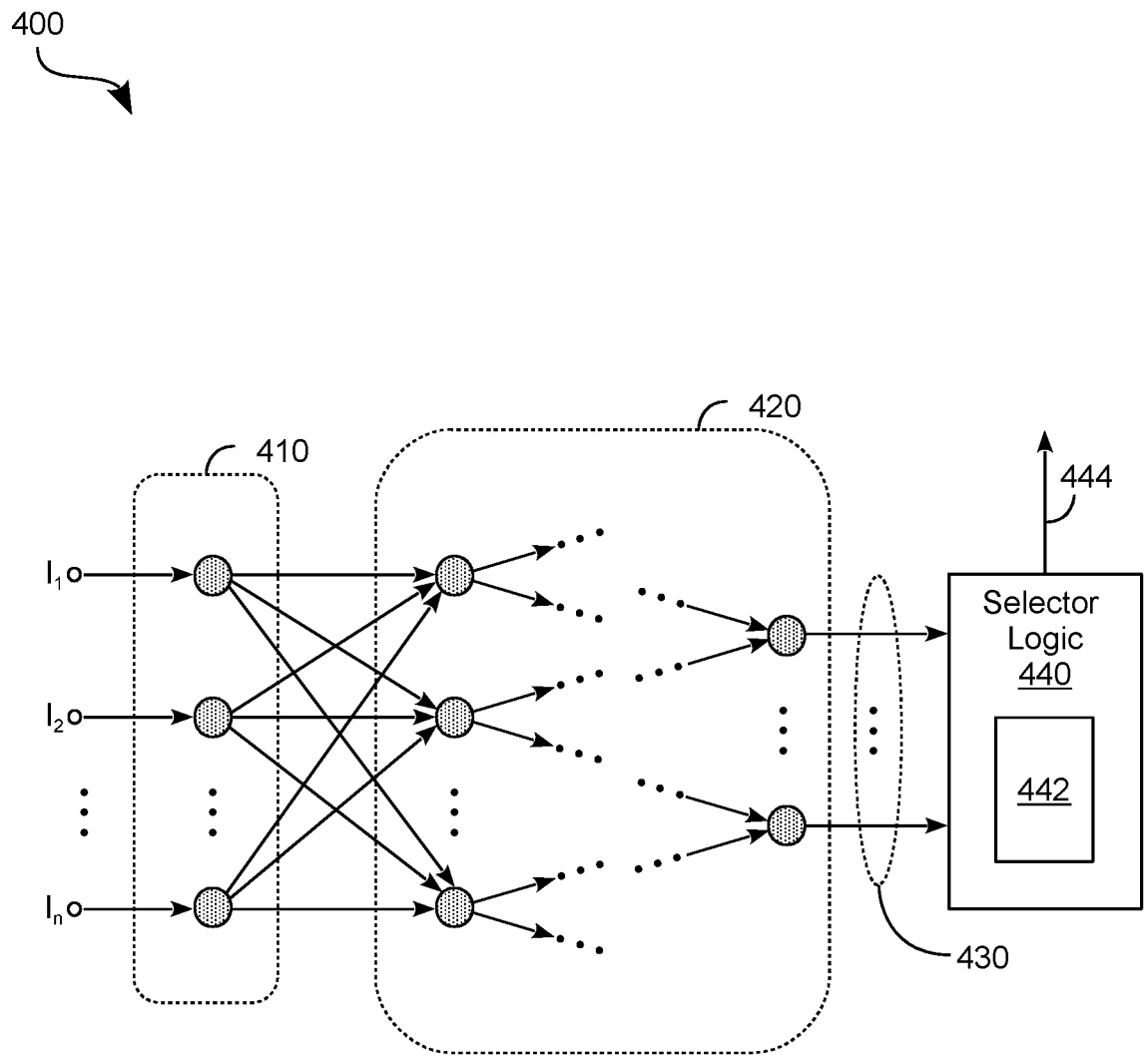
FIG. 4 is a functional block diagram illustrating elements of a system to provide image recognition functionality with a spiking neural network according to an embodiment.

FIG. 4 shows features of a system 400 to evaluate image information with a spiking neural network according to an embodiment. System 400 is one example of an application, in an embodiment, wherein synaptic weight values of a spiking neural network are updated each based on the respective spiking rates of two corresponding spike trains. The updating of such synaptic weights may be according to method 200—e.g., wherein system 400 includes features of spiking neural network 100.

As shown in FIG. 4, a spiking neural network of system 400 may include first set of nodes 410 and a second set of nodes 420 coupled thereto. In one example embodiment, the first set of nodes 410 and the second set of nodes 420 include n nodes and m nodes, respectively (wherein n and m are positive integers). Synapses coupling the first set of nodes 410 to the second set of nodes may provide a connection matrix F of dimensions (n×m)—e.g., wherein each of the n nodes of first set of nodes 410 is coupled to each of the m nodes of the second set of nodes 420 via a different respective synapse of matrix F. Alternatively or in addition, the second set of nodes 420 may include a connection matrix W having dimensions (m×m) whereby each of the second set of nodes 420 is coupled to each other node of the second set of nodes 420. However, any of various other spiking neural network topologies may be used, in different embodiments, to enable the updating of synaptic weights based on the respective spiking rates of spike trains.

The first set of nodes 410 may function as afferent nodes which are to variously receive input signals (such as the illustrative signals $I_1, I_2, \ldots, I_n$ shown) representing information to train the spiking neural network. Nodes of the first set of nodes 410 may encode respective ones of signals $I_1, I_2, \ldots, I_n$ and variously provide corresponding spike trains to the second set of nodes 420. Spike trains from first set of nodes 410 may result in a communication of various other spike trains each between respective nodes of the second set of nodes 420. Such communication may, in turn, result in training of the second set of nodes 420—e.g., wherein synaptic weights of the second set of nodes 420 are variously updated as described herein. The training may be facilitated by an encoding scheme, provided by the first set of nodes 410, which promotes or otherwise enables detection of spiking frequency relationships and/or phase relationships (e.g., including phase change relationships) between at least some spike trains communicated at the second set of nodes 420.

For example, the encoding scheme may result in spike trains of the second set of nodes 420 having similar or otherwise correlated spiking frequencies. As a result, changes to such spiking rate frequencies may be used as a basis for detecting, for the purpose of updating a synaptic weight, whether or how any causal relation between spike trains might be indicated. Rather than contributing to random or otherwise irregularly fluctuating spiking rates, the encoding scheme may result in spike trains which each exhibit more resonant (cyclical) characteristics. A phase of such a spike train, in relation to another spike train, may reflect whether or how a synaptic weight might be updated.

Signals $I_1, I_2, \ldots, I_n$ may represent any of a variety of types of information for which the spiking neural network is to be trained—e.g., wherein signals $I_1, I_2, \ldots, I_n$ represent static images, audio clips, video sequences or other information which the spiking neural network is being trained to recognize. In one example embodiment, signals $I_1, I_2, \ldots, I_n$ are used to variously represent static images (e.g., including symbols, shapes, faces or the like), wherein the spiking neural network is to be trained to recognize said images. By way of illustration and not limitation, signals $I_1, I_2, \ldots, I_n$ may each correspond to a different respective image (or a different respective row of an image). In such an embodiment, a given signal $I_x$ of signals $I_1, I_2, \ldots, I_n$ may communicate, to a corresponding node $N_x$ of the first set of nodes 410, pixel values for a sequence of pixels including, for example, pixels in a given row of an image. In turn, node $N_x$ may output, to one or more nodes of the second set of nodes 420, a spike train which represents the sequence of pixels.

An encoding scheme provided by the first set of nodes 410 may, in one example embodiment, represent the respective intensity values of pixels each with a corresponding amplitude of an oscillating signal. For example, a given node $N_x$ of the first set of nodes 410 may generate or operate based on a bias current $J_b$ which, at a given time, represents an intensity of an image pixel p according to the following:

$$J_b = \underline{A_p} \sin(\omega_1 t + \phi_1) + b_1, \quad (7)$$

where t is time, $b_1$ is a positive fixed bias value, $\omega_1$ and $\phi_1$ are a frequency and phase (respectively) of current $J_b$, and $A_p$ is an intensity of pixel p. The value of frequency $\omega$ may facilitate signal processing by which a node is to integrate a received stimulus over multiple time periods which, for example, are each equal to the membrane time-constant ($\tau_m$) for the node that receives $J_b$. Alternatively or in addition, some or all nodes of the set of nodes 420 may each be given a respective oscillatory bias signal—e.g., wherein a node q gets a bias signal $J_q$ represented as:

$$J_q = J_0 \sin(\omega_q t + \psi_q), \quad (8)$$

where t is time, and where $J_0$, $\omega_q$ and $\psi_q$ are an amplitude, frequency and phase (respectively) of bias signal $J_q$. At least initially, $\psi_q$ may be randomly chosen from the range $[0, 2\pi]$, for example. Alternatively or in addition, $\omega_q$ may be the same as a frequency (e.g., $\omega_1$) which is used by the first set of nodes 410.

By representing image data, or other training information, with spike trains which exhibit resonant signal spiking characteristics, some embodiments variously enable the use of spiking frequency information as a basis for detecting a causal relationship between signal spiking by one node and signal spiking of another node. Any of a various encoding schemes and/or bias schemes (in addition to those described herein) may be used, in different embodiments, to enable the updating of a synaptic weight based on spiking rates at a spiking neural network.

The spiking neural network of system 400 may be trained, based on signals $I_1, I_2, \ldots, I_n$, to generate a particular type of output signaling which has been preassigned to correspond to (e.g., to be indicative of) a particular type of image ("image type"). For example, signals $I_1, I_2, \ldots, I_n$ may represent reference images which are each of a respective one of multiple image type which the spiking neural network is to be trained to recognize. Alternatively or in addition, signals $I_1, I_2, \ldots, I_n$ may represent to the already trained spiking neural network one or more test images (e.g., real-world images) which are to be subject to image recognition processing by the spiking neural network. Based on such processing, the spiking neural network may communicate one or more output spike trains (for example, via the illustrative synapses 430 shown) which indicate whether a given test image represents an instance of some image type which the spiking neural network is trained to recognize.

By way of illustration and not limitation, system 400 may further comprise or couple to hardware and/or executing software (such as the illustrative selector logic 440 shown) which is to receive the one or more output spike trains via synapses 430. Selector logic 440 may include any of various processors, application specific integrated circuits (ASICs), field programmable gate arrays (FPGAs) and/or other circuitry configured to identify an image type as corresponding to the one or more output spike trains—e.g., wherein such identifying includes selecting one image type from a plurality of image types which the spiking neural network is trained to recognize. In the example embodiment shown, selector logic 440 may include or couple to reference data 442 which identifies one or more reference signal characteristics as being indicative of a given image type. Selector logic 440 may evaluate the one or more output spike trains, based on such one or more reference characteristics, to determine whether (or not) a particular image type is indicated by the one or more output spike trains. Selector logic 440 may output a signal 444 representing a result of such a determination.

Figure 5:
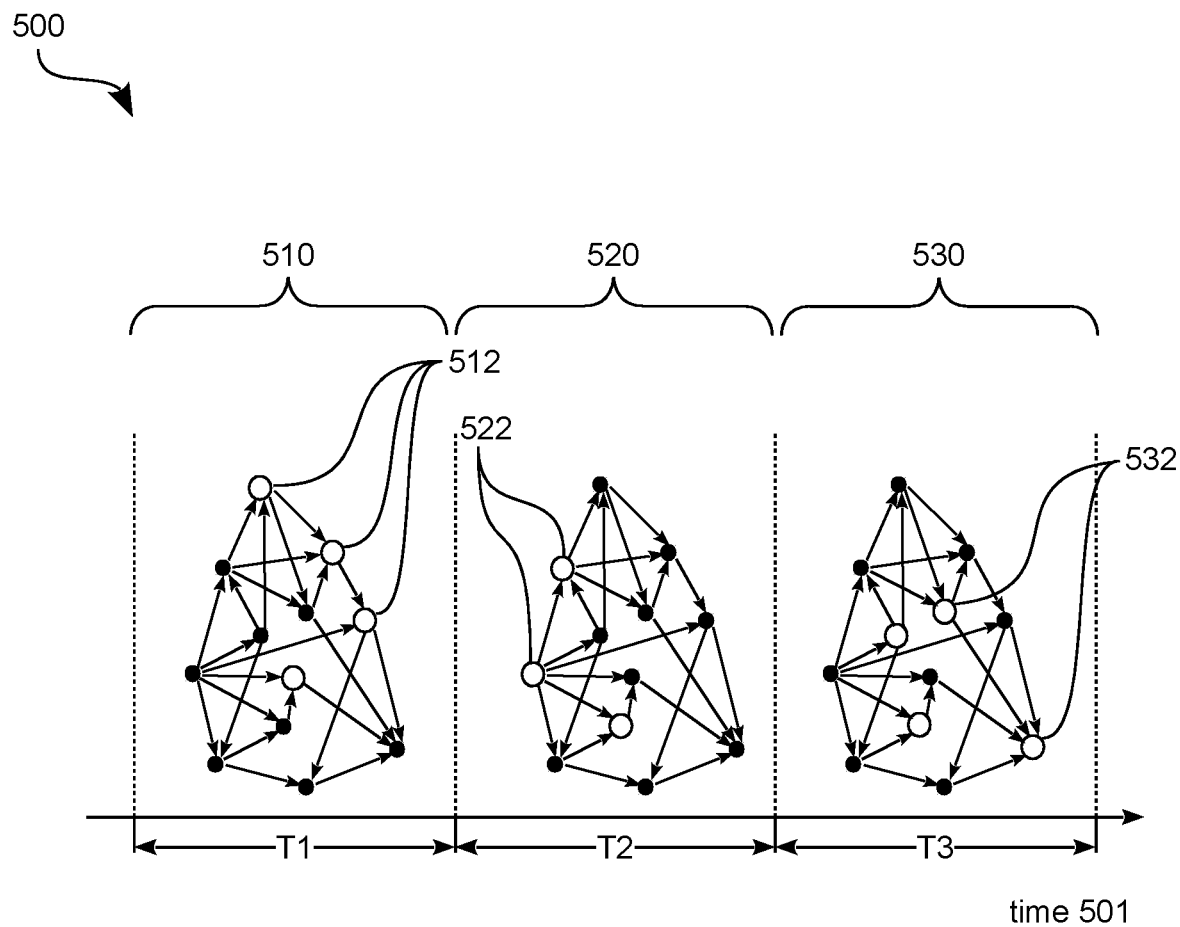
FIG. 5 shows a timing diagram illustrating state transitions of a spiking neural network determine values of synaptic weights according to an embodiment.
Figure 5:
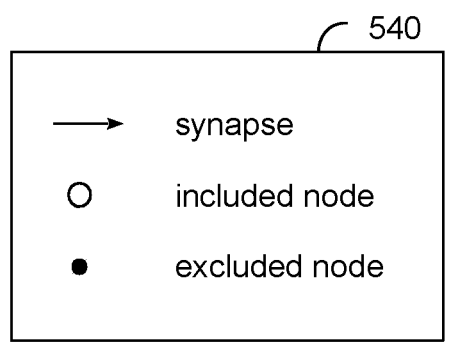

FIG. 5 shows a timing diagram 500 illustrating a configuration sequence used to determine synaptic weight values of a spiking neural network according to an embodiment. Timing diagram 500 illustrates a sequence that may be performed with spiking neural network 100 or system 400, for example.

As shown in timing diagram 500, a sequence of different configurations of a spiking neural network may include the illustrative configurations 510, 520, 530 shown. Multiple ones of such configurations 510, 520, 530 may each enable a different respective combination of nodes of the spiking neural network to perform a respective synaptic weight determining process—e.g., wherein other nodes are each prevented from similarly performing a respective synaptic weight determining process. Some combinations may each include the same node being enabled to perform a synaptic weight determining process.

As shown in the legend 540, the "included node" symbol represents a node for which synaptic weight updating is currently enabled, and the "excluded node" symbol represents a node for which synaptic weight updating is currently disabled. In one example scenario a configuration 510 of the spiking neural network shown (the configuration during a period T1 of time 501) includes synaptic weight updating being enabled for each of nodes 512. During a next period T2 of time 501, a different configuration 520 of the spiking neural network may include other nodes 522 having synaptic weight updating enabled. Subsequently, a next configuration 530 of the spiking neural network, during a period T3, may include still another combination of nodes 532 having synaptic weight updating enabled.

By successively implementing different configurations 510, 520, 530 of the spiking neural network over time, some embodiments variously limit the possibility of spiking neural network training which has to be subsequently unlearned. In some embodiments, selectively configuring different combinations of nodes to participate in (or be excluded from) synaptic weight updating processes mitigates the possibility of signal interference between different stages of a network training process. Otherwise, signaling during a given phase of an image recognition process—the phase being for a particular image or at least a particular one or more pixels of the image—may, for example, be improperly affected by other signaling which is a result of an earlier-in-time phase of neural network training (e.g., for a different image or a different one or more pixels of the same image)

Figure 6:
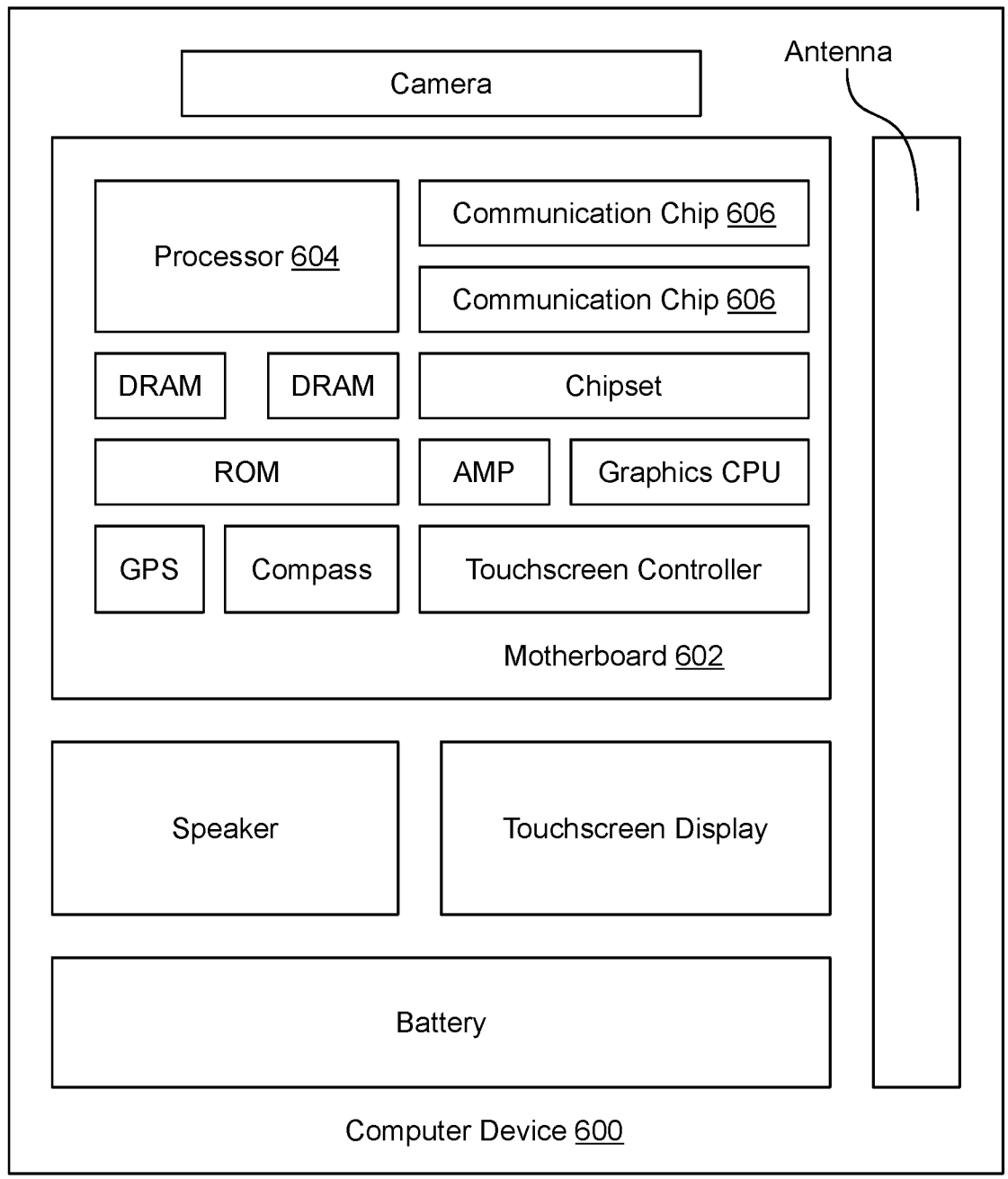
FIG. 6 is a functional block diagram illustrating a computing device in accordance with one embodiment.

FIG. 6 illustrates a computing device 600 in accordance with one embodiment. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

Depending on its applications, computing device 600 may include other components that may or may not be physically and electrically coupled to the board 602. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. The term "processor" may refer to any device or portion of a device that processes electronic data from registers and/or memory to transform that electronic data into other electronic data that may be stored in registers and/or memory. The communication chip 606 also includes an integrated circuit die packaged within the communication chip 606.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 7:
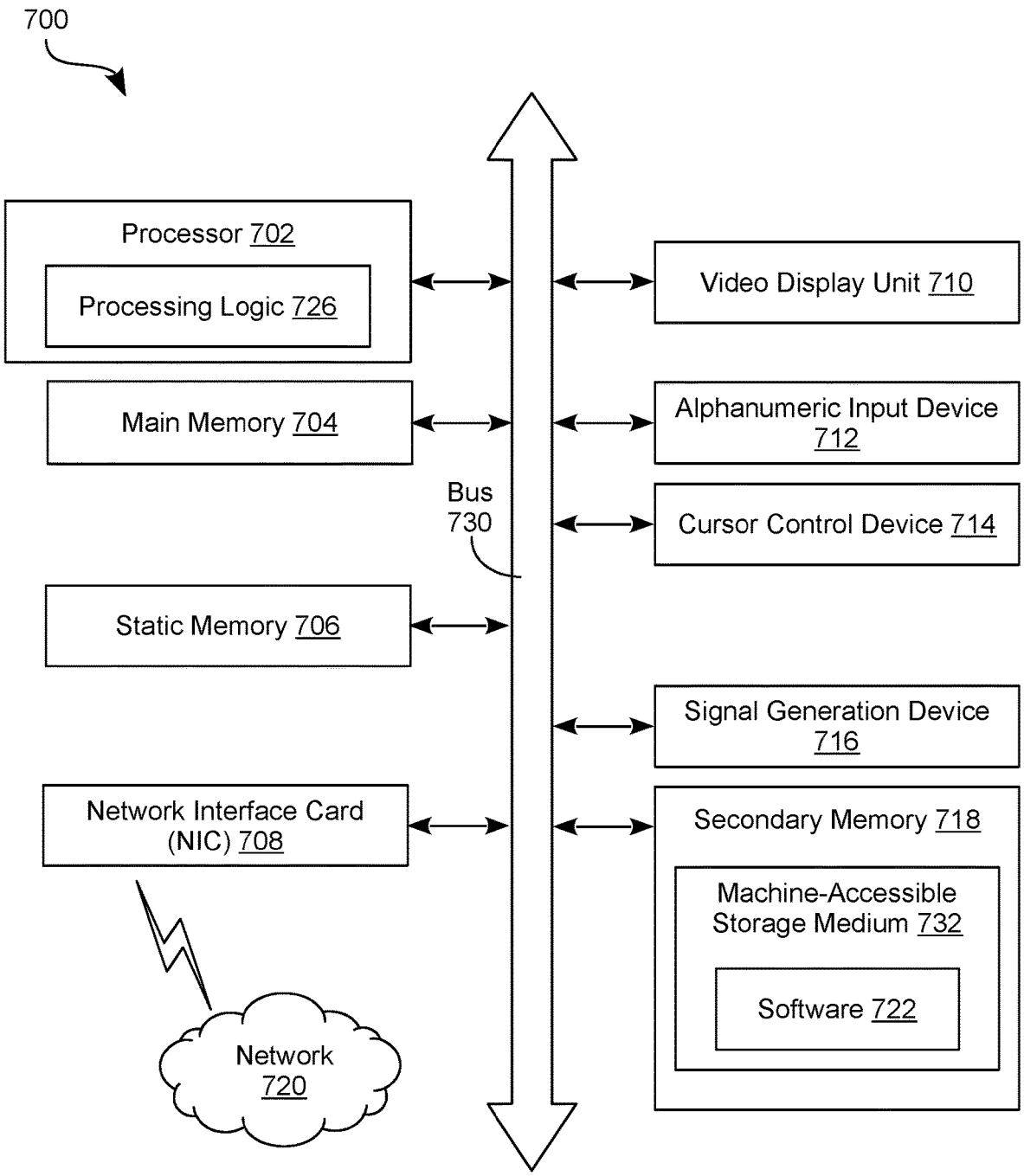
FIG. 7 is a functional block diagram illustrating an exemplary computer system, in accordance with one embodiment.

FIG. 7 illustrates a diagrammatic representation of a machine in the exemplary form of a computer system 700 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations described herein.

The computer system 700 may further include a network interface device 708. The computer system 700 also may include a video display unit 710 (e.g., a liquid crystal display (LCD), a light emitting diode display (LED), or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-accessible storage medium (or more specifically a computer-readable storage medium) 732 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

While the machine-accessible storage medium 732 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Example 1 is a computer device for training a spiking neural network to recognize a data type, the computer device comprising circuitry to communicate a first generated spike train from a first node of a spiking neural network, the first generated spike train based on one or more signal spikes of a first received spike train provided to the first node, wherein the first generated spike train exhibits a first rate of spiking, and communicate a second generated spike train from a second node of the spiking neural network, the second generated spike train based on one or more signal spikes of a second received spike train provided to the second node, wherein the second generated spike train exhibits a second rate of spiking, and wherein a synapse is directly coupled to each of the first node and the second node. The circuitry is further to apply a first value of a synaptic weight to at least one signal spike communicated via the synapse, and determine a second value of the synaptic weight, including circuitry to signal a change to apply to the first value of the synaptic weight, the change based on a product of a first value based on the first rate of spiking and a second value based on the second rate of spiking, wherein a training of the spiking neural network is based on the change being applied to the first value.

In Example 2, the subject matter of Example 1 through optionally includes wherein the change is based on a product of a first derivative of the first rate of spiking and a second derivative of the second rate of spiking.

In Example 3, the subject matter of any one or more of Examples 1 through 2 optionally includes wherein the first derivative and the second derivative each include a respective one of a first order derivative and a second order derivative.

In Example 4, the subject matter of any one or more of Examples 1 through 3 optionally includes wherein the first node is to send the first generated spike train to the second node via the synapse.

In Example 5, the subject matter of any one or more of Examples 1 through 4 optionally includes wherein the first generated spike train and the second generated spike train are each to be communicated via a respective path which is independent of the synapse.

In Example 6, the subject matter of any one or more of Examples 1 through 5 optionally includes wherein the second generated spike train is to be determined based on the first generated spike train.

In Example 7, the subject matter of any one or more of Examples 1 through 6 optionally includes wherein the first generated spike train and the second generated spike train are each to be determined based on a different respective spike train.

In Example 8, the subject matter of any one or more of Examples 1 through 7 optionally includes the computer device further comprising circuitry to select a first subset of nodes of the spiking neural network to train the spike neural network, during a first time period, to determine updates to weights of respective synapses.

In Example 9, the subject matter of Example 8 optionally includes the computer device further comprising circuitry to select a second subset of nodes of the spiking neural network to train the spike neural network, during a second time period, to determine updates to weights of respective synapses.

Example 10 is at least one machine readable medium including instructions that, when executed by a machine, cause the machine to perform operations for training a spiking neural network to recognize a data type, the operations comprising communicating a first generated spike train from a first node of a spiking neural network, the first generated spike train based on one or more signal spikes of a first received spike train provided to the first node, wherein the first generated spike train exhibits a first rate of spiking, and communicating a second generated spike train from a second node of the spiking neural network, the second generated spike train based on one or more signal spikes of a second received spike train provided to the second node, wherein the second generated spike train exhibits a second rate of spiking, and wherein a synapse is directly coupled to each of the first node and the second node. The operations further comprise applying a first value of a synaptic weight to at least one signal spike communicated via the synapse, and determining a second value of the synaptic weight, including signaling a change to apply to the first value of the synaptic weight, the change based on a product of a first value based on the first rate of spiking and a second value based on the second rate of spiking, wherein a training of the spiking neural network is based on the change being applied to the first value.

In Example 11, the subject matter of Example 10 optionally includes wherein the change is based on a product of a first derivative of the first rate of spiking and a second derivative of the second rate of spiking.

In Example 12, the subject matter of any one or more of Examples 10 through 1 optionally includes wherein the first derivative and the second derivative each include a respective one of a first order derivative and a second order derivative.

In Example 13, the subject matter of any one or more of Examples 10 through 12 optionally includes wherein the first node sends the first generated spike train to the second node via the synapse.

In Example 14, the subject matter of any one or more of Examples 10 through 13 optionally includes wherein the first generated spike train and the second generated spike train are each communicated via a respective path which is independent of the synapse.

In Example 15, the subject matter of any one or more of Examples 10 through 14 optionally includes wherein the second generated spike train is determined based on the first generated spike train.

In Example 16, the subject matter of any one or more of Examples 10 through 15 optionally includes wherein the first generated spike train and the second generated spike train are each determined based on a different respective spike train.

In Example 17, the subject matter of any one or more of Examples 10 through 16 optionally includes the operations further comprising selecting a first subset of nodes of the spiking neural network to train the spike neural network, during a first time period, to determine updates to weights of respective synapses.

In Example 18, the subject matter of Example 17 optionally includes the operations further comprising selecting a second subset of nodes of the spiking neural network to train the spike neural network, during a second time period, to determine updates to weights of respective synapses.

Example 19 is a method for training a spiking neural network to recognize a data type, the method comprising communicating a first generated spike train from a first node of a spiking neural network, the first generated spike train based on one or more signal spikes of a first received spike train provided to the first node, wherein the first generated spike train exhibits a first rate of spiking, communicating a second generated spike train from a second node of the spiking neural network, the second generated spike train based on one or more signal spikes of a second received spike train provided to the second node, wherein the second generated spike train exhibits a second rate of spiking, and wherein a synapse is directly coupled to each of the first node and the second node. The method further comprises applying a first value of a synaptic weight to at least one signal spike communicated via the synapse, and determining a second value of the synaptic weight, including signaling a change to apply to the first value of the synaptic weight, the change based on a product of a first value based on the first rate of spiking and a second value based on the second rate of spiking, wherein a training of the spiking neural network is based on the change being applied to the first value.

In Example 20, the subject matter of Example 19 optionally includes wherein the change is based on a product of a first derivative of the first rate of spiking and a second derivative of the second rate of spiking.

In Example 21, the subject matter of any one or more of Examples 19 through 20 optionally includes wherein the first derivative and the second derivative each include a respective one of a first order derivative and a second order derivative.

In Example 22, the subject matter of any one or more of Examples 19 through 21 optionally includes wherein the first node sends the first generated spike train to the second node via the synapse.

In Example 23, the subject matter of any one or more of Examples 19 through 22 optionally includes wherein the first generated spike train and the second generated spike train are each communicated via a respective path which is independent of the synapse.

In Example 24, the subject matter of any one or more of Examples 19 through 23 optionally includes wherein the second generated spike train is determined based on the first generated spike train.

In Example 25, the subject matter of any one or more of Examples 19 through 24 optionally includes wherein the first generated spike train and the second generated spike train are each determined based on a different respective spike train.

In Example 26, the subject matter of any one or more of Examples 19 through 25 optionally includes the method further comprising selecting a first subset of nodes of the spiking neural network to train the spike neural network, during a first time period, to determine updates to weights of respective synapses.

In Example 27, the subject matter of Example 26 optionally includes the method further comprising selecting a second subset of nodes of the spiking neural network to train the spike neural network, during a second time period, to determine updates to weights of respective synapses.

Techniques and architectures for determining a value of a synaptic weight with a spiking neural network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A computer device for training a spiking neural network to recognize a data type, the computer device comprising circuitry to:
communicate a first generated spike train from a first node of a spiking neural network, the first generated spike train based on one or more signal spikes of a first received spike train provided to the first node, wherein the first generated spike train exhibits a first rate of spiking;
communicate a second generated spike train from a second node of the spiking neural network, the second generated spike train based on one or more signal spikes of a second received spike train provided to the second node, wherein the second generated spike train exhibits a second rate of spiking, and wherein a synapse is directly coupled to each of the first node and the second node;
apply a first value of a synaptic weight to at least one signal spike communicated via the synapse; and
determine a second value of the synaptic weight, including circuitry to signal a change to apply to the first value of the synaptic weight, the change based on a product of a first value based on the first rate of spiking and a second value based on the second rate of spiking, wherein a training of the spiking neural network is based on the change being applied to the first value.

2. The computer device of claim 1, wherein the change is based on a product of a first derivative of the first rate of spiking and a second derivative of the second rate of spiking.

3. The computer device of claim 1, wherein the first derivative and the second derivative each include a respective one of a first order derivative and a second order derivative.

4. The computer device of claim 1, wherein the first node is to send the first generated spike train to the second node via the synapse.

5. The computer device of claim 1, wherein the first generated spike train and the second generated spike train are each to be communicated via a respective path which is independent of the synapse.

6. The computer device of claim 1, wherein the second generated spike train is to be determined based on the first generated spike train.

7. The computer device of claim 1, wherein the first generated spike train and the second generated spike train are each to be determined based on a different respective spike train.

8. The computer device of claim 1, further comprising circuitry to select a first subset of nodes of the spiking neural network to train the spike neural network, during a first time period, to determine updates to weights of respective synapses.

9. The computer device of claim 8, further comprising circuitry to select a second subset of nodes of the spiking neural network to train the spike neural network, during a second time period, to determine updates to weights of respective synapses.

10. At least one non-transitory machine readable medium including instructions that, when executed by a machine, cause the machine to perform operations for training a spiking neural network to recognize a data type, the operations comprising:
communicating a first generated spike train from a first node of a spiking neural network, the first generated spike train based on one or more signal spikes of a first received spike train provided to the first node, wherein the first generated spike train exhibits a first rate of spiking;
communicating a second generated spike train from a second node of the spiking neural network, the second generated spike train based on one or more signal spikes of a second received spike train provided to the second node, wherein the second generated spike train exhibits a second rate of spiking, and wherein a synapse is directly coupled to each of the first node and the second node;
applying a first value of a synaptic weight to at least one signal spike communicated via the synapse; and
determining a second value of the synaptic weight, including signaling a change to apply to the first value of the synaptic weight, the change based on a product of a first value based on the first rate of spiking and a second value based on the second rate of spiking, wherein a training of the spiking neural network is based on the change being applied to the first value.

11. The at least one non-transitory machine readable medium of claim 10, wherein the change is based on a product of a first derivative of the first rate of spiking and a second derivative of the second rate of spiking.

12. The at least one non-transitory machine readable medium of claim 10, wherein the first derivative and the second derivative each include a respective one of a first order derivative and a second order derivative.

13. The at least one non-transitory machine readable medium of claim 10, wherein the first node sends the first generated spike train to the second node via the synapse.

14. The at least one non-transitory machine readable medium of claim 10, wherein the first generated spike train and the second generated spike train are each communicated via a respective path which is independent of the synapse.

15. The at least one non-transitory machine readable medium of claim 10, wherein the second generated spike train is determined based on the first generated spike train.

16. The at least one non-transitory machine readable medium of claim 10, wherein the first generated spike train and the second generated spike train are each determined based on a different respective spike train.

17. The at least one non-transitory machine readable medium of claim 10, the operations further comprising selecting a first subset of nodes of the spiking neural network to train the spike neural network, during a first time period, to determine updates to weights of respective synapses.

18. The at least one non-transitory machine readable medium of claim 17, the operations further comprising selecting a second subset of nodes of the spiking neural network to train the spike neural network, during a second time period, to determine updates to weights of respective synapses.

19. A method for training a spiking neural network to recognize a data type, the method comprising:
communicating a first generated spike train from a first node of a spiking neural network, the first generated spike train based on one or more signal spikes of a first received spike train provided to the first node, wherein the first generated spike train exhibits a first rate of spiking;

communicating a second generated spike train from a second node of the spiking neural network, the second generated spike train based on one or more signal spikes of a second received spike train provided to the second node, wherein the second generated spike train exhibits a second rate of spiking, and wherein a synapse is directly coupled to each of the first node and the second node;

applying a first value of a synaptic weight to at least one signal spike communicated via the synapse; and determining a second value of the synaptic weight, including signaling a change to apply to the first value of the synaptic weight, the change based on a product of a first value based on the first rate of spiking and a second value based on the second rate of spiking, wherein a training of the spiking neural network is based on the change being applied to the first value.

20. The method of claim 19, wherein the change is based on a product of a first derivative of the first rate of spiking and a second derivative of the second rate of spiking.

21. The method of claim 19, wherein the first derivative and the second derivative each include a respective one of a first order derivative and a second order derivative.

22. The method of claim 19, wherein the first node sends the first generated spike train to the second node via the synapse.

23. The method of claim 19, wherein the first generated spike train and the second generated spike train are each communicated via a respective path which is independent of the synapse.

24. The method of claim 19, wherein the second generated spike train is determined based on the first generated spike train.

25. The method of claim 19, wherein the first generated spike train and the second generated spike train are each determined based on a different respective spike train.

* * * * *